United States Patent [19]
Hunerberg et al.

[11] Patent Number: 5,135,703
[45] Date of Patent: Aug. 4, 1992

[54] SEQUENTIAL METHOD OF OPERATION OF COMBINATION PLASTIC AND GAS INJECTION NOZZLE ASSEMBLY

[75] Inventors: Edward C. Hunerberg, Tecumseh; Neil Daly, Jackson, both of Mich.

[73] Assignee: Hoover Universal, Inc., Plymouth, Mich.

[21] Appl. No.: 701,093

[22] Filed: May 16, 1991

Related U.S. Application Data

[62] Division of Ser. No. 522,190, May 11, 1990, Pat. No. 5,054,689.

[51] Int. Cl.$^5$ .................... B29C 45/00; B29C 45/12; B29D 22/00
[52] U.S. Cl. ........................ 264/572; 264/37; 264/297.2; 264/328.8; 264/328.13
[58] Field of Search ............. 264/37, 85, 297.2, 328.8, 264/328.12, 328.13, 572

[56] References Cited

U.S. PATENT DOCUMENTS

| | | | |
|---|---|---|---|
| 4,601,870 | 7/1986 | Sasaki | 264/572 |
| 4,740,150 | 4/1988 | Sayer | 264/572 X |
| 4,824,732 | 4/1989 | Hendry et al. | 264/37 X |
| 4,855,094 | 8/1989 | Hendry | 264/572 X |

Primary Examiner—Leo B. Tentoni
Attorney, Agent, or Firm—Harness, Dickey & Pierce

[57] ABSTRACT

A combination plastic and gas injection nozzle assembly and method of operation in which the nozzle assembly includes a plastic resin passage, a closure member for the plastic resin passage, a gas flow passage, and a closure member for the gas flow passage all coaxial with respect to one another. Actuating cylinders are provided for moving both closure members between open and closed positions. The actuating cylinders being positioned coaxial with the other elements to eliminate off-set loading of the nozzle components. A sequential molding operation is disclosed in which a plurality of mold cavities defined by a single mold assembly are injected by one or more nozzles with plastic and a gas to form hollow spaces in the molded article. The cavities are injected with plastic one at a time to reduce the required mold clamping forces and enable independent control of plastic injection into each cavity. After partially filling each mold cavity, the nozzles are used to inject pressurized gas into the molten resin forcing the resin against the surface of the mold cavities and forming hollow spaces within the molded articles.

5 Claims, 6 Drawing Sheets

SEQUENTIAL METHOD OF OPERATION OF COMBINATION PLASTIC AND GAS INJECTION NOZZLE ASSEMBLY

CROSS-REFERENCE TO RELATED APPLICATION

This is a division of U.S. patent application Ser. No. 522,190, filed May 11, 1990 U.S. Pat. No. 5,054,689.

BACKGROUND AND SUMMARY OF THE INVENTION

The present invention relates to a plastic injection nozzle assembly and in particular to a nozzle assembly for use in injecting both plastic and a gas into a mold cavity. Such a nozzle assembly can be used for injection molding of thermal plastic parts with hollow walls, hollow ribs or hollow parts with solid webs connecting the walls together.

Injection molding of hollow parts is accomplished by first injecting into a mold cavity a predetermined quantity of molten plastic which is less than the volume of the mold cavity. After the plastic is injected, a gas is injected into the molten plastic forcing the plastic through the mold cavity and holding the plastic against the wall of the mold cavity while the plastic cools. This aids the external surface of the plastic material in assuming the precise shape dictated by the mold surface. The gas pressure also assists in filling the narrow portions of the mold cavity with plastic which is often difficult to accomplish and can only be accomplished with high injection pressures in a solid plastic injection molding. The use of the gas pressure will reduce the tendency of the plastic to shrink away from the mold walls during cooling. In solid injection molding the plastic is kept under high pressure to prevent shrinkage during cooling by maintaining the plastic injection pressure. However, this produces unwanted stress in the molded part as well as significant stress in the injection molding machinery.

In gas injection molding, articles are produced by injecting molten plastic into the mold cavity and charging a body of pressurized gas therein to form a hollow portion in the thermal plastic material. The gas may be nitrogen, air or other gas that will not react with the polymer being injected. Pressure is maintained on the gas in the hollow space within the molded object until the plastic material in the mold cavity has set. Thereafter, the pressurized gas is released from the molded part hollow area and the molded part can be taken out of the mold cavity.

Several nozzle assemblies have been proposed for both gas and plastic injection. These nozzles, however, suffer from one or more of the following deficiencies. Some nozzles require that the nozzle assembly be physically removed from the mold in order to vent the mold interior to exhaust the gas from the molded part interior. This is particularly disadvantageous when multiple nozzles are required to mold large parts. Some nozzles are prone to plastic plugging of the gas passage near the tip of the nozzle assembly. In order to prevent this plugging, the gas passages are often made extremely small in size which decreases the gas flow rate into and out of the mold cavity. Another disadvantage is that the actuators used to move various internal components of the nozzle assembly are often off-set to one side of the nozzle center line. This can create uneven loading of the moving components resulting in binding of these components, increasing wear and nozzle maintenance.

It is an objective of the present invention to provide a combination gas and plastic injection nozzle assembly that overcomes the above mentioned deficiencies.

The combination gas and plastic injection nozzle of the present invention includes a tubular nozzle body that is tapered at one end to form a nozzle tip. The nozzle body forms an orifice at the tip through which the molten plastic is injected into the mold. The opposite end of the nozzle body is coupled to a conventional injection molding machine for receiving molten plastic resin. A hollow closure rod extends longitudinally through the nozzle body and serves as a plug that is movable into the nozzle body orifice to close the orifice, stopping the flow of plastic. The annular space between the exterior of the hollow rod and the nozzle body forms a flow passage for the molten plastic. The orifice is opened by retracting the nozzle rod into the nozzle body.

The interior of the hollow closure rod forms a passage for the injection gas. The end of the nozzle rod forms a small orifice through which the gas is injected into the mold after the nozzle rod has closed the nozzle tip to plastic. A second hollow rod, a gas rod, extends through the nozzle rod to supply the injection gas to the orifice at the end of the nozzle rod. The gas rod ends in a closed tip which is seated against an interior engagement surface of the nozzle rod to close the gas orifice. The gas rod is longitudinally movable away from the seat to initiate the flow of gas. Openings in the gas rod before the closed tip enable the gas to flow from the gas rod into the gas passage in the nozzle rod.

Both the nozzle rod and the gas rod are moved by actuating cylinders that are positioned in line with the axis of the nozzle body so as to avoid an off-set load of either rod as they are moved.

It is a further object of the present invention to provide an improved process utilizing a mold with multiple cavities and at least one nozzle assembly for each mold cavity.

The injection nozzle assemblies are particularly useful in a multiple nozzle injection molding process. Injection molding process efficiencies can be improved by providing a mold with multiple cavities to produce multiple articles with a single closing and opening of the mold. By using multiple nozzles with at least one nozzle per cavity within a mold assembly, a sequential process can be used in which the cavities are filled with plastic one at a time rather than all cavities being filled simultaneously. Such a sequential process has numerous advantageous over a simultaneous process using one nozzle connected to several mold cavities by a runner system. By separately injecting the resin into each cavity, the quantity of plastic to each cavity and the flow rate can be controlled individually for each cavity. Likewise, the subsequent gas injection into each cavity can also be independently controlled. A further advantage is that the mold clamping load can be significantly reduced since only one cavity is subjected to the plastic injection pressure at any given time. This enables lighter weight mold components to be used and also decreases the process time required to build up the necessary mold clamping force.

Further objects, features and advantages of the invention will become apparent from a consideration of the following description and the appended claims when taken in connection with the accompanying drawings.

DETAILED DESCRIPTION OF THE INVENTION

Figure 1A:
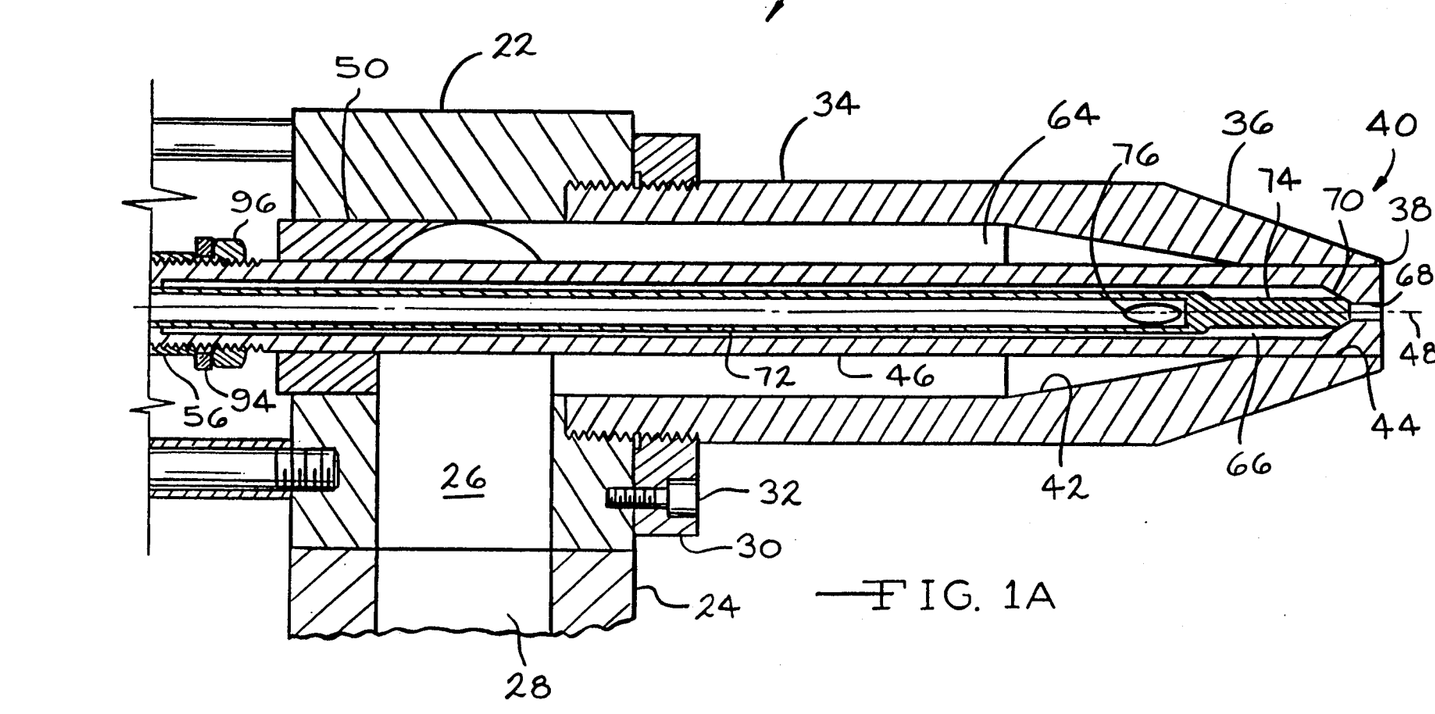
FIGS. 1A and 1B are partial sectional and partial elevational views of the nozzle assembly with each figure illustrating half of the nozzle assembly.
Figure 1B:
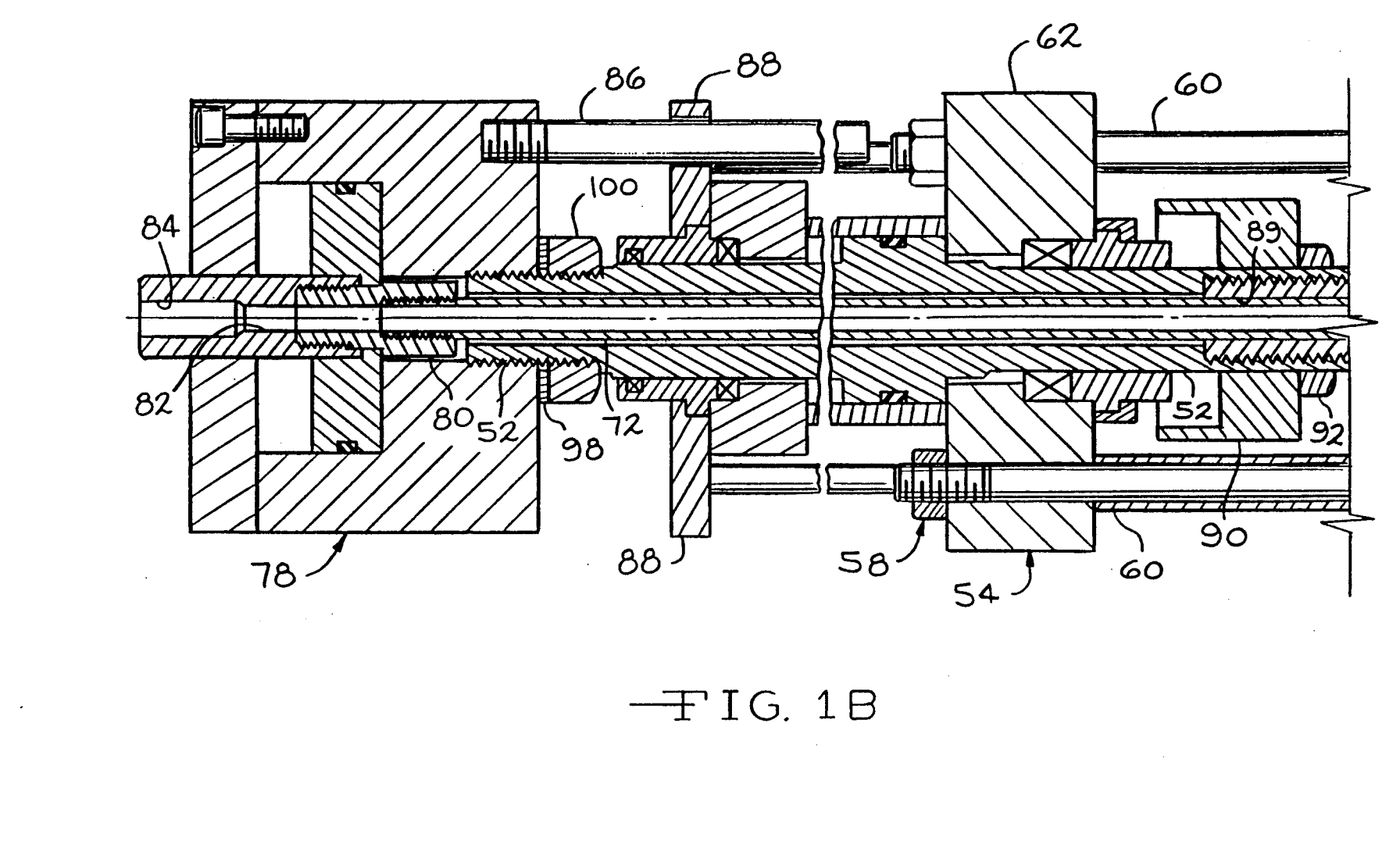

The combination gas and plastic injection nozzle assembly of the present invention is shown in FIGS. 1A and 1B and designated generally at 20. Nozzle assembly 20 is constructed upon a nozzle block 22 coupled to a thermal plastic resin supply manifold 24. Inlet 26 of the nozzle block receives the molten plastic resin from passage 28 in the manifold. Manifold 24 is in turn coupled to a conventional extrusion injection unit such as a reciprocating screw or a screw and plunger type unit (not shown). Threaded into the nozzle block and retained by a locking collar 30 and bolts 32 is a tubular nozzle body 34. The surface 36 of the nozzle body is tapered adjacent the distal end 38 of the body, forming a nozzle tip 40. The inner surface of the nozzle body at 42 is likewise tapered radially inwardly toward the end 38 and forms an orifice 44 at the tip 40.

A rod 46 extends longitudinally through the nozzle body 34 and is generally centered within the nozzle body about the longitudinal axis 48. Rod 46, referred to as a nozzle rod or a closure rod, is longitudinally movable within nozzle body 34 as will be described below. In FIG. 1, the nozzle rod 46 is shown in a closed position inserted into the orifice 44 where it acts as a plug to close the orifice and the nozzle assembly to the flow of plastic. Nozzle rod 46 is guided by bushing 50 within the nozzle block. Bushing 50 also prevents pressurized plastic from leaking from the nozzle block 22.

The nozzle rod 46 extends beyond bushing 50 and is coupled to the piston rod 52 of the nozzle rod actuating cylinder 54 through the threaded coupling 56. The cylinder 54 is mounted to the nozzle block 22 by nut and bolt assemblies 58. Sleeves 60, between the end plate 62 of cylinder 54 and the nozzle block position the cylinder 54 relative to the nozzle block. The actuating cylinder 54 is in line with the axis 48 of the nozzle assembly.

Figure 2:
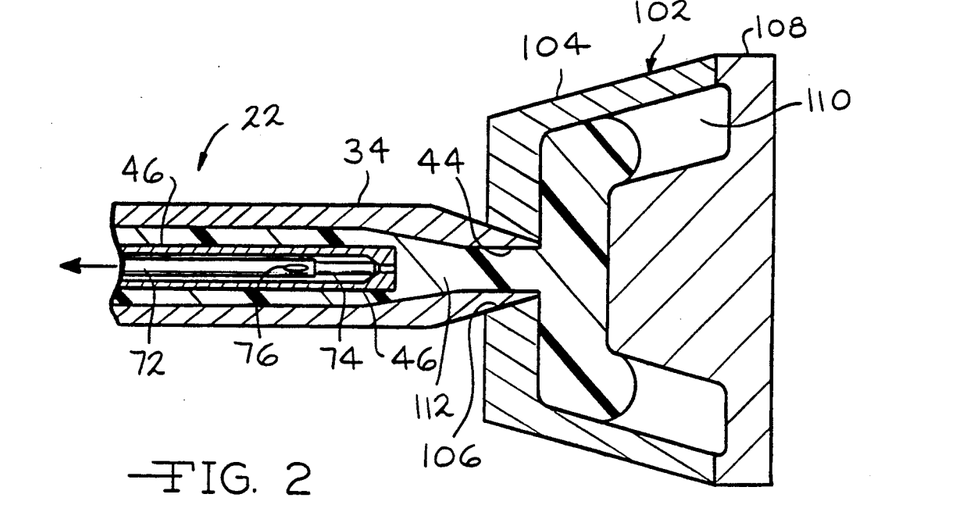
FIG. 2 is a sectional view of a portion of the nozzle assembly and a mold showing plastic being injected into the mold cavity.

When actuated, the cylinder 54 retracts the nozzle rod 46 from the orifice 44 to the open position shown in FIG. 2 allowing plastic from the manifold to flow through the annular plastic flow passage 64 between the nozzle rod 46 and nozzle body 34 and through the orifice 44 into the mold. Once the desired volume of plastic resin has been injected into the mold, the cylinder 34 will again be actuated to move the nozzle rod 46 to the closed position shown in FIG. 1, closing the nozzle orifice 44. Due to the high plastic resin pressures, actuating cylinder 44 will typically be a hydraulic cylinder.

The nozzle rod 46 is also hollow, forming a fluid passage 66 near the nozzle tip 40 for a pressurized fluid, typically gas, to be injected into the mold. The end of the nozzle rod forms a small diameter orifice 68 of a relatively short length. The interior surface of the nozzle rod is tapered at 70 reducing the diameter of the interior passage leading to orifice 68.

Pressurized gas is provided to the gas passage 66 through a hollow gas rod 72 that extends through the nozzle rod 46 and the piston rod 52. The end of gas rod 72 at nozzle tip includes a solid tip 74. The gas rod tip is shown in FIG. 1 in the closed position seated against the tapered surface 70 at orifice 68. The gas rod 72 includes vent openings 76 adjacent the tip 74 to allow pressurized gas to travel from the gas rod into the passage 66 and through orifice 68 into the mold cavity.

Figure 3:
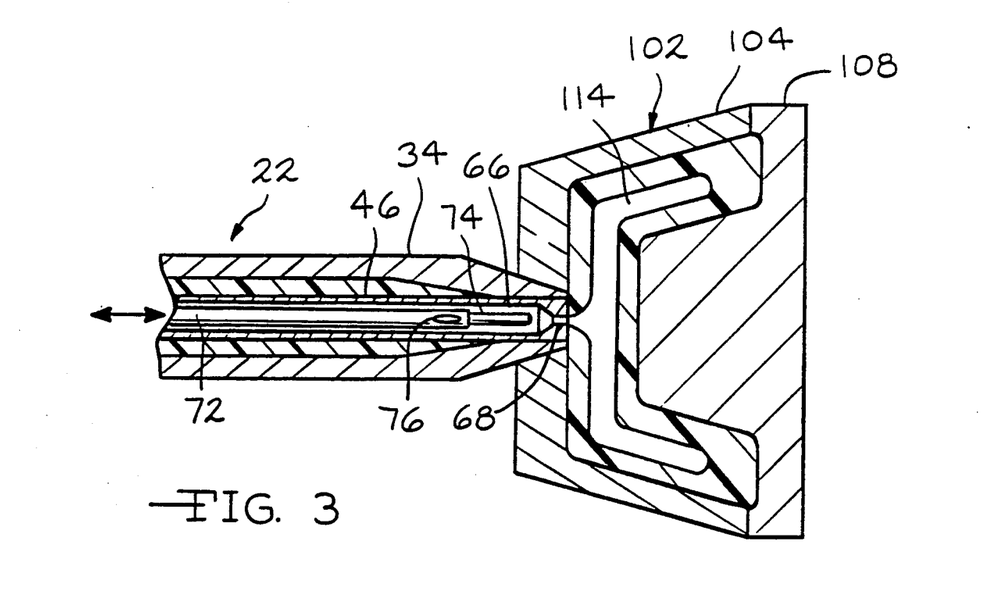
FIG. 3 is a sectional view similar to FIG. 2 showing gas being injected into the plastic in the mold cavity.

The gas rod 72 is longitudinally movable to retract the tip 74 from seat 70 to allow passage of the pressurized gas through orifice 68 into the mold cavity. FIG. 3 illustrates the gas rod in the open position.

Gas rod 72 is longitudinally moved by gas rod actuating cylinder 78. The piston rod 80 of actuating cylinder 78 is coupled to the end of gas rod 72 and forms a gas flow passage 82 therethrough and a fitting 84 at its opposite end for connection with a gas supply.

The gas rod 72 is seated against the nozzle rod tapered surface 70 to close the orifice 68. This orifice is closed when the nozzle rod is moved, the gas rod must move the gas rod actuating cylinder 78 is mounted to the piston rod 52 of the nozzle rod actuating cylinder 54 so that orifice 68 is kept closed. Gas rod actuating cylinder 78, like nozzle rod actuating cylinder 54, is in line with the axis 48 of the nozzle assembly to eliminate off-set loads to the nozzle rods and resulting binding and wear. Guide rods 86, projecting axially from the actuating cylinder 78, extend through the end plate 88 of nozzle rod actuating cylinder 54 to guide the gas rod actuating cylinder, as it is moved. The nozzle rod 46 inner bore of the end of the nozzle rod opposite tip 40 is of a reduced internal diameter 89 to provide a bearing surface for the gas rod.

A stroke limiter 90 is threadably mounted on the piston rod 52 and held in place by jam nut 92. Stroke limiter 90 is used to adjust the length of travel of the nozzle rod 46. The position of the nozzle rod end relative to the tapered inner surface 42 of the nozzle body can be used to throttle the flow of the plastic resin through the annular resin passage 64.

A static seal 94 held in place on the nozzle rod by nut 96 prevents gas from escaping from the gas passage 66 through the threaded coupling 56 between the nozzle rod 46 and piston rod 52. Likewise, seal 98 and nut 100 prevent gas from leaking past the coupling of the piston rod 52 and the gas rod actuating cylinder 78. The use of a static gas seals eliminates wear of the seal that occurs with dynamic seals. The static seal thus reduces maintenance and down time of the nozzle assembly.

Figure 6:
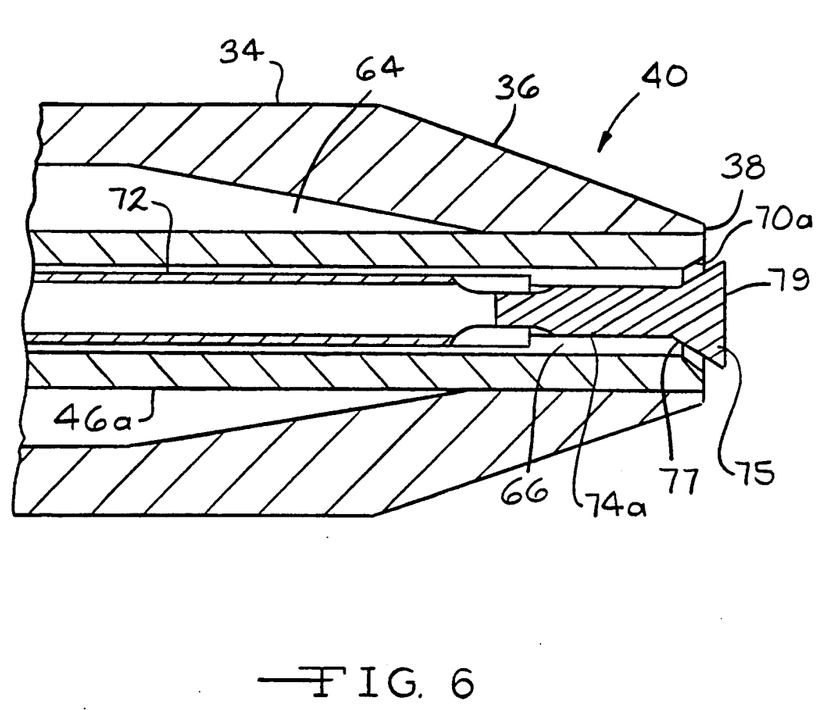
FIG. 6 is a sectional view of a portion of the nozzle assembly showing an alternative embodiment.

An alternative embodiment of the nozzle is shown in FIG. 6 where identical components are given the same reference numbers as in FIGS. 1A and 1B while similar but modified components are the same reference number followed by the suffix "a". In this embodiment, the gas rod tip 74a extends from the nozzle assembly rather than retracts into the assembly to open the gas passage. The tip 74a terminates in a frusto-conical enlargement 75. A portion of the conical surface 77 engages the tapered seat 70a of the nozzle rod 46a to close the gas passage. Actuating cylinder 78 is used to hold the tip 74a in the closed position.

When the gas is to be injected into the molten resin in the mold, the cylinder 78 is vented to atmosphere on both sides of the piston while the gas passage 66 is pressurized with the injection gas. When the plastic pressure force acting on surface 79 at the end of tip 74a reduces to a value lower than the gas pressure force acting on the conical surface 77 in the opposite direction, the gas forces will cause the tip to move into the plastic to the open position shown in FIG. 6. This ensures that the gas flow orifice will not open until the plastic pressure is reduced to avoid plastic back flow into the gas orifice. Once the gas passage opens, the cylinder 78 is pressurized to hold the gas rod and tip in the open position until the plastic cools and the gas vented. After this, the cylinder 78 is actuated to close the gas passage.

FIGS. 2 and 3 illustrate the injection molding operation with nozzle assembly 20 coupled to a mold assembly 102. The mold assembly includes a stationary mold half 104 with a tapered aperture 106 sized to receive the nozzle tip 40. Movable mold half 108 and stationary mold half 104 define a mold cavity 110 in communication with the opening 106. The nozzle rod 46 is retracted in FIG. 2 to open the nozzle body orifice 44 allowing a shot of plastic resin 112 to be injected into the mold cavity. The plastic shot is of a smaller volume than the cavity 110. Once the plastic is injected, the nozzle rod 46 is moved to the closed position shown in FIG. 3 terminating the flow of plastic into or out of the mold. After orifice 44 is closed, the gas rod 72 and tip 74 are retracted from orifice 68 and pressurized gas is injected through gas rod 72, vent opening 76, gas passage 66 and orifice 68 into the mold cavity. The pressurized gas forces the plastic resin outward against the walls of the mold cavity forming a hollow area 114 in the molded article. The gas rod 72 is maintained in the open position and the gas pressure maintained in the mold cavity while the plastic resin is cooled. When the resin is cooled sufficiently that the article can be removed from the mold, the gas is exhausted from the mold cavity, reducing the pressure in the hollow area 114 to approximately atmospheric pressure. After which, the gas rod is returned to the closed position engaging seat 70 and the mold is opened and the article removed.

Figure 4:
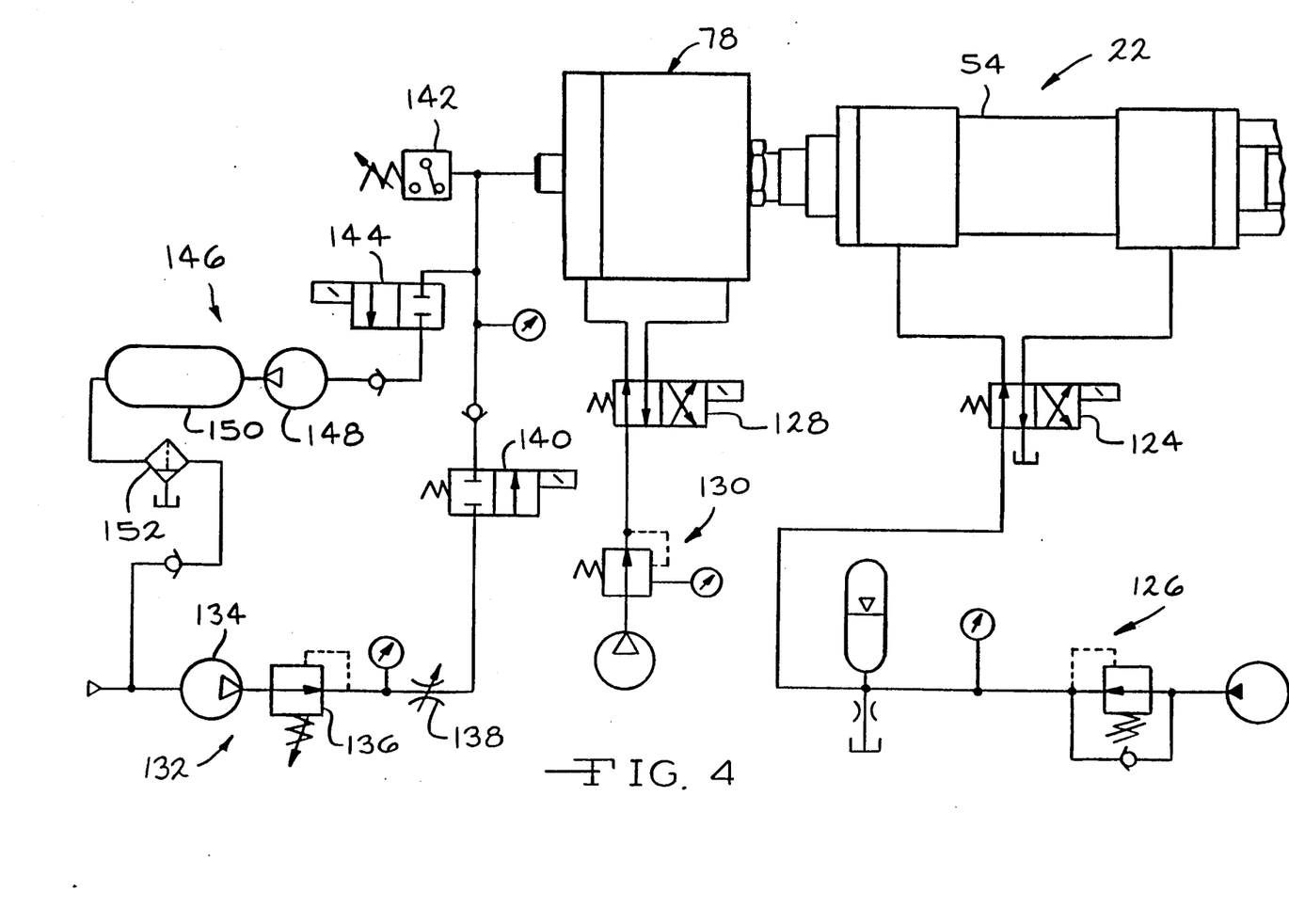
FIG. 4 is a schematic illustration of the control systems for the nozzle assembly.

FIG. 4 illustrates the hydraulic and pneumatic control systems for the actuating cylinders 54 and 78 and for supplying pressurized gas to the mold cavity. The control system for actuating cylinder 54 includes a directional valve 124 and a source of hydraulic pressure 126 including a pump, pressure regulating valve and accumulator. The valve 124 is spring biased to the position shown in FIG. 4 in which fluid pressure is normally provided to the left side of cylinder 54 as viewed in FIG. 1 holding the nozzle rod 46 in the closed position. When the nozzle rod is to be retracted to permit plastic flow, the valve is actuated, directing the hydraulic fluid to the right side of cylinder 54 and draining the left side of the cylinder to a reservoir.

Pneumatic cylinder 78 is controlled by a directional valve 128 and a pressurized gas source 130 including a pump and pressure regulator valve. The cylinder 78 is normally pressurized on the left side holding the gas rod tip 74 against the tapered seat 70. When valve 128 is actuated, the air flow is directed to the right side of the cylinder, retracting the gas rod to open orifice 68.

The supply of pressurized gas to the mold cavity is regulated by pneumatic control system 132. Pump 134 designates a source of high pressure gas. The pump may be used to fill receiver tanks (not shown) with pressurized gas. The gas may also be supplied by other means such as a common plant gas supply or a high pressure gas tank. The pump 134 is illustrative of one way of supplying a pressurized gas and is not to be viewed as a limitation.

Pressure regulator 136 reduces the gas pressure to the desired injection pressure and the gas flow is controlled by valve 138. Solenoid valve 140 starts and stops the gas injection. A gas pressure switch 142 shuts off the gas if mold cavity pressure does not obtain a predetermined value. After gas injection, once the molded part has cooled, valve 140 is returned to the closed position and an exhaust valve 144 is opened.

Valve 144 can vent the gas to atmosphere or, as shown in FIG. 4, the gas can be vented to a recovery system 146 to recover and reuse the pressurized gas. Recovery system 146 includes an exhaust pump 148, receiver 150, filter and separator 152 and ultimately returns the gas to the vacuum side of pressurizing pump 134. When using a gas other than air, the operating cost of the nozzle assembly is reduced if the gas is recovered for reuse. Furthermore, use of an exhaust pump 148 decreases the time necessary to reduce the gas pressure in the molded article to a pressure at which the mold can be opened. This reduces the molding cycle time, improving the machine efficiency.

Figure 5:
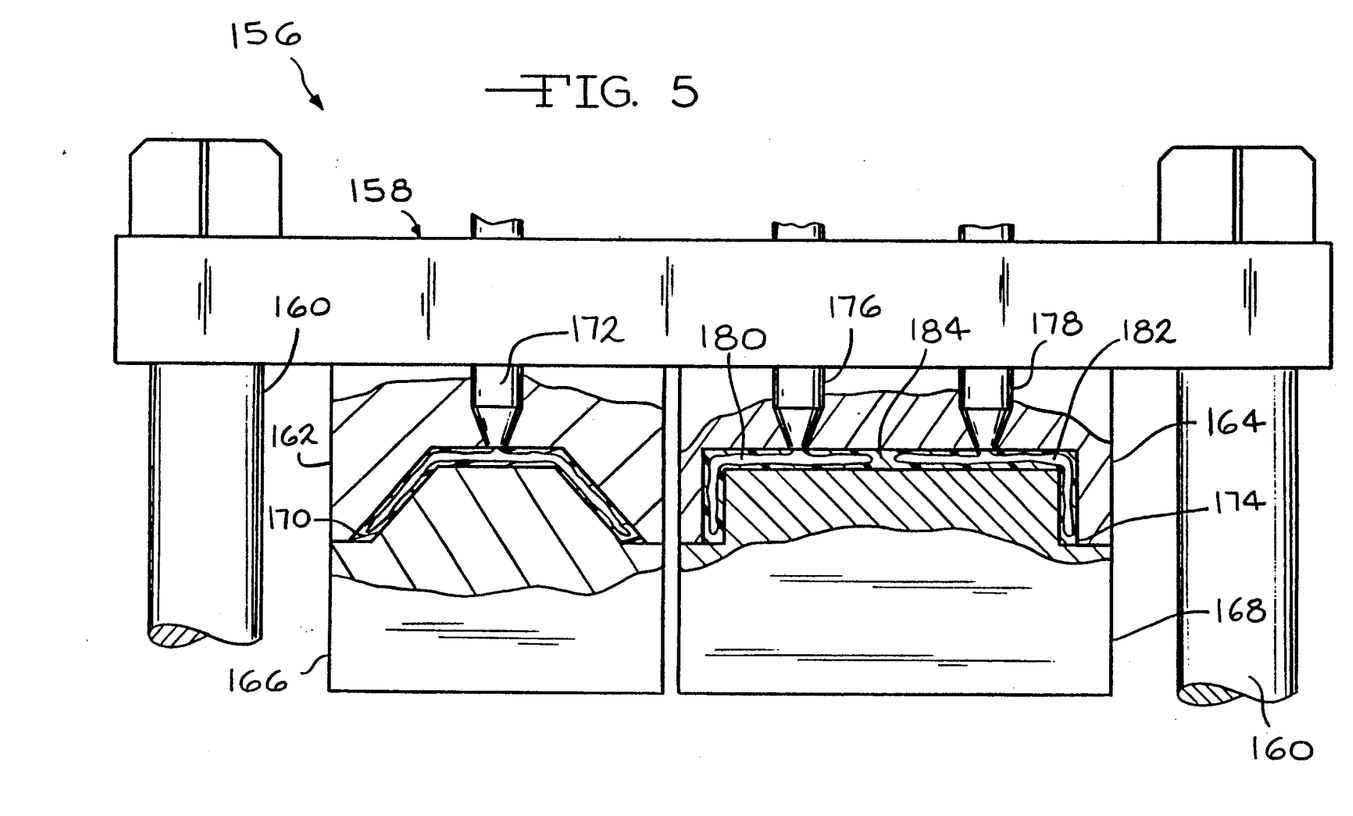
FIG. 5 is a partial sectional and partial elevational view of a mold assembly with the nozzle assemblies of the present invention.

The sequential molding process is described with reference to FIG. 5. A multiple cavity mold assembly 156 is shown including a stationary platen 158 and tie rods 160. Stationary mold halves 162 and 164 are attached to the stationary platen. Movable mold halves 166 and 168 are carried by a movable platen (not shown). Mold halves 162 and 166 cooperate to define a mold cavity 170 which is fed by a gas and plastic nozzle assembly 172. Mold halves 164 and 168 define a mold cavity 174 which is fed by two nozzle assemblies 176 and 178. Nozzle assemblies 172, 176 and 178 are identical to nozzle assembly 22 described above.

The molding operation is performed by first closing the mold assembly 156. After a sufficient mold clamping force is achieved, nozzle 172 is actuated to inject molten plastic into mold cavity 170. When the desired quantity of resin has been injected into the mold cavity, the nozzle is closed. After a short time delay, generally 1-5 seconds, the gas rod is opened and pressurized gas flows into the hot polymer core. The time delay allows the plastic pressure to decrease from its injection pressure before the gas orifice is opened. This helps prevent plastic back flow into the gas nozzle. If desired, it is possible to begin the gas injection before the plastic injection is completed. In such a case, the gas pressure must be sufficiently high to prevent plastic back flow into the gas orifice. When injected, the gas takes the path of least resistance through the plastic.

After the resin has been injected into cavity 170, the nozzles 176 and 178 are actuated to inject plastic resin into cavity 174 with the gas being injected thereafter forming two hollow spaces 180 and 182 in the molded article. Hollow space 180 communicates with nozzle assembly 176 while hollow space 182 communicates with nozzle assembly 178. A solid zone of plastic 184 is formed at the interface between the two hollow spaces 180 and 182.

The mold closure force necessary to resist the plastic injection pressure and hold the mold cavities closed is less if the two cavities are injected sequentially, i.e. one at a time, rather than injecting both cavities simultaneously. As a result, the process cycle time is reduced since less time is required to reach the necessary mold closure force. Additionally, lighter weight mold components can be used and/or less material used in the mold assembly reducing the cost of material and the size of the hydraulic system required for moving the mold halves and developing the closure force.

During the molding process, the nozzle 172 is opened while the plastic accumulator piston is moved, injecting the plastic into the mold cavity. Once the piston has moved a predetermined distance, supplying the desired shot to cavity 170, the accumulator piston is stopped and the nozzle rod move to the closed position in nozzle assembly 172. After which, the nozzle rods in nozzle assemblies 176 and 178 are moved to the open position and the accumulator piston is again actuated to supply plastic to cavity 174.

With sequentially injection, the nozzle assembly 172 is operated independently of nozzles assemblies 176 and 178, ensuring that the proper shot size is delivered to cavity 170. If the cavities were simultaneously filled, the relative proportions of resin injected by each nozzle would be affected by pressure differentials between the nozzles, localized hot or cold spots, etc. As a result, the shot size into each mold could not be precisely controlled. This would also occur if one nozzle was used to feed multiple cavities through a runner system.

Furthermore, with the process of this invention, the gas injection into each cavity is also independently controlled rather than utilizing a single control system to simultaneously inject gas into both cavities. This is particularly important with respect to the gas injection since the gas will form a hollow passage through the molten plastic following the path of least resistance. With sequential gas injection, the gas path through each mold cavity is independently controlled. With simultaneous injection, more gas may flow to one mold cavity than desired while another cavity does not receive sufficient gas.

The solid plastic block 184 between the two hollow spaces 180 and 182 is useful to improve the strength of the polymer weld line occurring at the junction of the two resin shots from each nozzle assembly. If such a block is not desired, only one nozzle can be used for the gas injection in which case a single hollow space will be created in the molded article communicating with the nozzle assembly that used to inject the gas. In a typical molding operation, only one nozzle is used to inject the gas into a mold cavity.

It is to be understood that the invention is not limited to the exact construction or method illustrated and described above, but that various changes and modifications may be made without departing from the spirit and scope of the invention as defined in the following claims.

We claim:

1. A method of injection molding a plurality of articles each including at least one interior hollow space in a mold assembly defining a plurality of mold cavities and having a plurality of injection nozzles with at least one nozzle communicating with each mold cavity, comprising the steps of:

sequentially injecting molten plastic resin into said cavities through said nozzles to partially fill said mold cavities;

with respect to each mold cavity, after at least a portion of said resin has been injected therein, injecting pressurized gas into the molten resin in said cavity through at least one of the nozzles communicating with said cavity, said gas forcing said resin into contact with the surface of said cavity and forming said at least one interior hollow spaces with the molded article;

removing said gas from said molded articles through at least one nozzle communicating with said cavities.

2. The method of claim 1 further comprising the step of recovering said removed gas.

3. The method of claim 1 wherein an exhaust pump is used to remove said gas from said molded articles.

4. The method of claim 2 wherein an exhaust pump is used to remove said gas from said molded articles.

5. The method of claim 1 wherein said gas injection is delayed from said plastic injection to allow the pressure of said plastic to decrease.

* * * * *